Patented Nov. 1, 1949

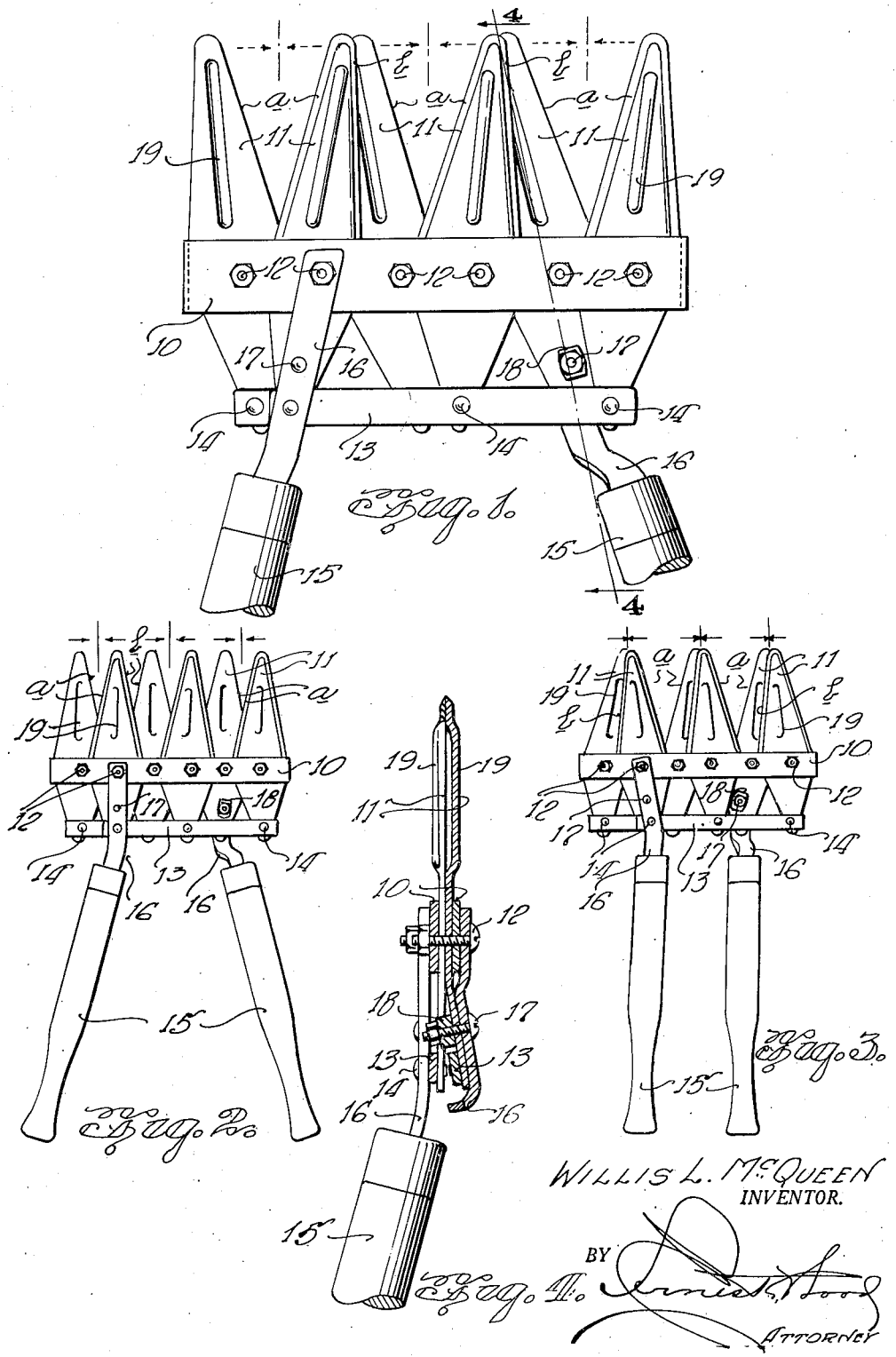

2,486,958

UNITED STATES PATENT OFFICE 2,486,958

HEDGE CLIPPERS

Willis L. McQueen, Dallas, Tex., assignor to Crow Machine and Equipment Company, Lubbock, Tex.

Application January 26, 1946, Serial No. 643,566

2 Claims. (Cl. 30—211)

This invention relates to hedge cutting implements and more particularly to hedge clippers of the multiple blade type.

The principal object of the invention is to provide hedge shears or clippers comprising cooperating sets of double acting shear blades, each of which blades has two fulcrum points, one adjacent its rear extremity and another intermediate its ends, the said fulcrum pivots being journaled in reciprocable bars, to which handles are pivoted to effect alternate movement thereof, resulting in equal displacement of the sets of blades in a compound shearing action.

Another object of the invention is to provide a hedge cutting implement which, by virtue of the combined movement of the blades of each set, a collection of twigs are constrained by the blades to move into cutting position between each of the series of active pairs of blades as the handles are actuated. The cutting action of the sets of blades are alternated as the handles are moved to operate the blades and to advance the tool into the work.

Still another object of the invention is to provide a hedge cutting implement which, by virtue of the comparatively wide cutting range of its blades and maximum cutting action obtained by compelling movement of each individual blade, speedier work may be accomplished with greater accuracy and alignment irrespective of the plane in which the cutting is to be done.

With the foregoing objects as paramount the invention has further reference to certain features of accomplishment which will become apparent as the description proceeds taken in connection with the accompanying drawing wherein:

Figure 1 is a plan view of a hedge cutting tool constructed according to the present invention, showing the cooperating sets of blades in one extreme position.

Figure 2 is a similar view but in reduced scale, showing the intermediate position of the blades.

Figure 3 is a view similar to Figures 1 and 2, showing the opposite extreme position of the blades to that shown in Figure 1, and Figure 4 is a sectional view taken on line 4—4 on Figure 1.

Continuing with a more detailed description of the drawing, reference numeral 10 denotes parallel mounting bars between which are pivoted intermediate their ends parallel sets of shear blades 11. Each blade is movable on its individual pivot 12. A second pair of relatively parallel bars 13 provide for equal displacement of the rear extremities of the blades 11 and to one of which the rear extremities of one set of blades are pivoted at 14 while the companion set of blades is similarly pivoted to the companion bar. It is obvious that through the described mounting arrangement, the bars 13 may be alternately reciprocated longitudinally but remain relatively parallel with each other and with the mounting bar on frame 10. As the bars 13 are reciprocated, the blades 11 change their relative position, presenting their confronting sharpened edges $a$ to the work as they are moved in one direction and upon reversal, the sharpened confronting edges $b$ receive and shear the work.

To actuate the bars 13 in the manner described to effect oscillation of the blades, handles 15 are provided, each having an arm 16, one of which is pivoted to the bars 10 and 13 on one side of the blade assembly by means of pivots 12 and 14 respectively, by which the blade next adjacent the end blades is pivoted to the frame 10 to one of the bars 13. That blade whose pivotal mounting serves as the pivotal point of arm 16 is constrained to move in unison with handle 15 by a bolt 17, passing through the said arm 16 and the said blade. The companion handle 15 is similarly attached to the frame 10 through the arm 16 and in each instance, the handle arm 16, which is preferably of flat stock, is slightly twisted, as shown to insure adequate expansion of the blades in one direction and full contraction in the opposite direction, yet permitting the handles 15 to reach parallelism in the latter position of the blades as exemplified in Figure 3. Moreover, by virtue of the twist in the arms 16, the handles 15 are constrained to move in the same plane which, as apparent in Figure 4, is at an obtuse angle with respect to the plane of the blade assembly so that the handles will be in an elevated position in relation to the work.

In order to limit displacement of one set of blades with respect to the complementary set, a stop block 18 is mounted on the bolt 17 by which one of the handle arms 16 is secured to a blade 11. This block is so positioned that it will be brought into engagement with the tail portion of one and then the other of juxtapositioned blades 11 as the sets of blades are moved from one extreme position to the other in operating the implement. The angular sides of the block are such that conformity with the edges of the alternately engaging blades is assured upon such engagement.

As a means to reinforce the shearing ends of the blades 11, longitudinal ribs 19 are formed therein. These ribs are also effective to maintain flush frictional relationship between faces of the blades of one set and those of the complementary set with increased pressure next adjacent the edges to accelerate the shearing action of the blades.

Manifestly, the construction as shown and described is capable of some modification and such modification as may be construed to fall within the scope and meaning of the appended claims is also considered to be within the spirit and intent of the invention.

What is claimed is:

1. A hedge cutting shears including relatively parallel and coextensive straps defining a frame, two sets of cutting blades disposed in overlapping relationship between said straps, the blades of each set being pivoted intermediate their ends to said straps for independent pivotal displacement, a pair of bars parallel with said frame, to one of which is pivoted the ends of the blades of one set opposite the cutting ends and to the other of which bars is similarly connected the ends of the companion set of blades, a pair of handles, each having an arm pivoted to an end of each of said bars on opposite sides of said frame, said arms being affixed each to an end blade of said sets whereby actuation of said handles will alternately displace said bars longitudinally to oscillate their respective sets of blades.

2. A hedge cutting tool including a frame comprised of parallel straps and two sets of cutting blades pivoted intermediate their ends between said straps in overlapping relationship, a pair of bars arranged for reciprocal, longitudinal displacement, to one of which the rear extremities of the blades of one set are pivoted, and to the other of said bars is pivoted the rear extremities of the companion set of blades, a pair of handles, each having an arm pivoted to an end of one of said bars and affixed to the blade pivoted thereto whereby actuation of said handles will alternately reciprocate said bars to impart oscillative motion to their respective sets of blades.

WILLIS L. McQUEEN.

REFERENCES CITED

The following references are of record in the file of this patent:

UNITED STATES PATENTS

| Number | Name | Date |
| --- | --- | --- |
| 1,502,331 | Bishop | July 22, 1924 |
| 1,980,092 | Rose | Nov. 6, 1934 |
| 2,105,576 | Wittek | Jan. 18, 1938 |